Feb. 5, 1952  M. P. GRAHAM  2,584,696
ROD AND TUBE ASSEMBLY
Filed Sept. 16, 1947
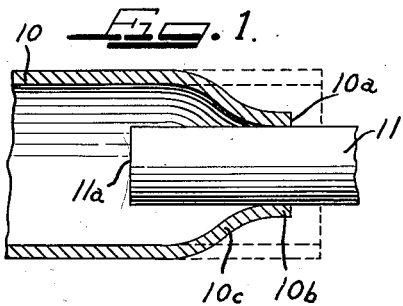
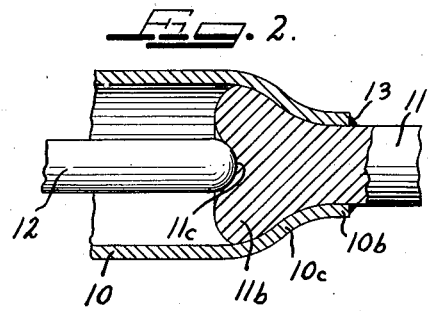
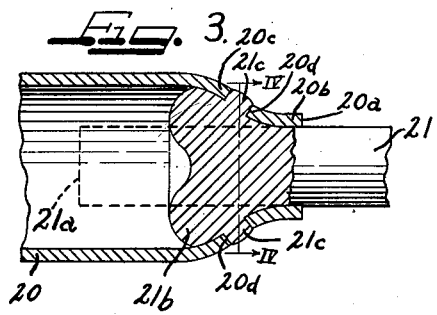
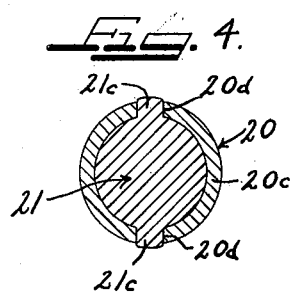
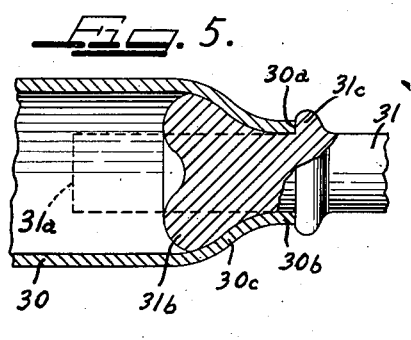
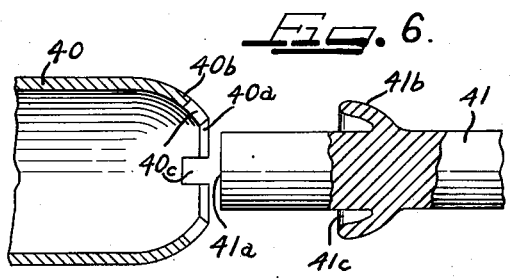
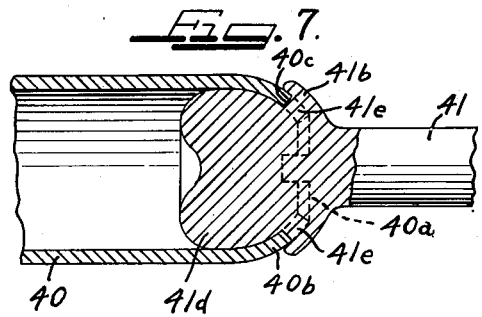
Inventor
MATTHEW P. GRAHAM.

Patented Feb. 5, 1952

2,584,696

UNITED STATES PATENT OFFICE 2,584,696

ROD AND TUBE ASSEMBLY

Matthew P. Graham, Detroit, Mich., assignor to Thompson Products, Inc., Cleveland, Ohio, a corporation of Ohio Application September 16, 1947, Serial No. 774,363

1 Claim. (Cl. 287—124)

This invention relates to the attachment of rods and tubes for forming firm connections therebetween.

Specifically the invention relates to the upsetting of rod ends in the swaged ends of tubes for locking the parts together in fixed relation.

Numerous mechanical assemblies, such as drag links on automobiles or trucks, require tubular housings on the ends of solid metal rods. This invention provides simplified arrangements for attaching the ends of rods and tubes.

According to this invention, a tube has the end thereof swaged down to reduced diameter size. A solid metal rod of a diameter sized for fitting in the reduced end of the tube is inserted through this reduced end to extend into the tube beyond the reduced end. The tube end is then upset and partially pierced to expand into firm engagement with the tube and have wedged coaction with the reduced end of the tube. In some modifications, the rod can be further welded to the tube while in other modifications, the rod can be forced through holes or slots in the tube for locking the tube and rod against relative rotation.

It is, then, an object of this invention to provide a simplified manner of attaching rods and tubes in end to end relation.

Another object of the invention is to provide rod and tube assemblies with easily formed joints for integrally connecting the parts.

A still further object of the invention is to provide a method of connecting solid rods to hollow tubes by tube-swaging and rod-upsetting operations.

A still further object of the invention is to provide a joint fixedly connecting a tube end and a rod end, which joint includes a wedge fit and an upset lug and key fit.

A further object of the invention is to provide a method of integrally connecting the end of a rod to the end of a tube by reducing the diameter of the tube end for snugly receiving the rod and by upsetting the end of the rod in the tube for following the contour of the reduced-diameter tube end.

Other and further objects of the invention will be apparent to those skilled in the art from the following detailed description of the annexed sheet of drawings which, by way of preferred examples only, illustrate several embodiments of the invention.

On the drawings:

Figure 1 is a fragmentary side elevational view with parts in vertical cross section, illustrating a tube and rod assembled for forming a connection according to this invention.

Figure 2 is a view similar to Figure 1 but illustrating the completed assembly and further showing an upsetting tool in the assembly.

Figure 3 is a side elevational view, with parts in vertical cross section, illustrating another form of rod and tube assembly according to this invention and showing in dotted lines the initial arrangement of the rod.

Figure 4 is a transverse cross-sectional view taken along the line IV—IV of Figure 3.

Figure 5 is a view similar to Figure 3 but illustrating another form of rod and tube assembly according to this invention.

Figure 6 is an exploded side elevational view, with parts in vertical cross section, of another form of tube and rod arranged for forming an assembly according to this invention.

Figure 7 is a view of the assembly formed from the parts of Figure 6, showing the parts in elevation and in vertical cross section.

As shown on the drawings:

In Figure 1 the reference numeral 10 designates generally a hollow tube initially of uniform diameter as shown in dotted lines. An end of the tube is swaged down at 10a to form a reduced-diameter end diverging to the main diameter of the tube from a cylindrical wall portion 10b thru a somewhat curved outwardly flaring wall 10c. A solid rod 11 is inserted in the reduced-diameter end 10a and has a diameter sized for snugly fitting the cylindrical portion 10b. The end of the rod 11 projects into the tube beyond the wall 10c at 11a.

As shown in Figure 2, an upsetting and piercing tool 12 is inserted in the tube 10 to act against the end 11a of the rod. The rod end is upset to form a head 11b thereon following the contour of the tube wall 10c. This head 11b is firmly bottomed on the tube wall 10c. The piercing tool partially enters into the end of the rod to form a recess 11c therein.

A welded bond 13 integrally connects the rod 11 with the end 10b of the tube to prevent the rod from extending further into the tube and for holding the head 11b tightly against the wall 10c.

The upsetting of the rod can take place while it is in a heated condition and, of course, as soon as the head 11b is formed, the punch or upsetting tool 12 is removed from the tube 10. The resulting connection or joint between the tube and rod firmly holds the parts in fixed longitudinal and rotatable relation. The wedge fit between the head 11b and the wall 10c is maintained by the weld 13 and the head and wall carry all tension loads on the parts.

In the modification shown in Figures 3 and 4, the tube 20 has a swaged down end 20a extending from a cylindrical portion 20b through a somewhat curved outwardly flaring wall 20c to the main diameter of the tube. However, the wall 20c has holes 20d punched therethrough. These holes can be in diametrically opposed relation as shown in Figure 4, or, if desired, additional holes could be used at spaced intervals around the periphery of the wall 20c. A rod 21 is inserted through the reduced end 20a of the tube 20 and has its free end 21a projecting beyond the wall 20c into the main body of the tube. This end 21a is then upset to form the head 21b in the manner described in connection with Figure 2. The upsetting operation, in addition to forming the head 21b, also forces the lugs 21c from the head into the holes 20d. These lugs 21c in effect are extruded through the holes 20d and become effective to form keys which lock the tube and rod against relative rotation. Wedge fit relationship between the head 21b and the wall 20c is also maintained by these lugs since they are locked in the holes and resist relative axial movement between the parts. Of course the head 21b carries the main tension loads. The weld 13 of the assembly shown in Figure 2 is not necessary.

In the embodiment shown in Figure 5, the tube 30 has the reduced swaged end 30a with a cylindrical end portion 30b and a somewhat curved diverging wall 30c extending to the main diameter of the tube. The rod 31 extends through the reduced end 30a of the tube to the depth 31a as shown in dotted lines. This end 31a of the rod 31 is upset to form a head 31b as described hereinabove. The rod is provided with a shoulder 31c abutting the end 30a of the tube and the head 31b coacts with this shoulder to wedgingly retain the wall 30c thereby holding the parts 30 and 31 against axial movement in either direction and also against relative rotational movement. The shoulder 31c, therefore, takes the place of the weld 13 in the assembly of Figure 2, or the lugs 21c in the assembly of Figures 3 and 4.

In the modification shown in Figures 6 and 7, the tube 40 has a swaged down reduced diameter end 40a. However, a semispherical wall 40b directly connects this reduced end portion 40a with the main diameter portion of the tube. The end 40a has slots 40c cut in the wall 40b thereof inwardly from the end at spaced intervals around the periphery of the wall. The rod 41 has an end portion 41a adapted to fit in the end 40a. An integral skirt portion 41b is formed on the rod in spaced relation from the end 41a and has a recess 41c adapted to receive the end 40a of the tube to overlie the slots 40c of the wall 40b.

As shown in Figure 7, the end of the rod 41 is upset to form the head 41d engaging the main diameter portion of the tube and also the fragmental spherical wall 40b. The skirt 41b overlies the reduced end of the tube but a portion of the head 41d of the rod is extruded through the slots 40c of the tube to form lugs 41e.

The wall 40b of the tube is conveniently formed by a curling-in operation rendered simple by the formation of the slotted end 40a. This end 40a, in effect, is a toothed section.

From the above descriptions it will be understood that this invention provides simplified joint connections between tubes and rods wherein the end of the rod is upset into firm anchored relation with a reduced diameter end of the tube.

It will, of course, be understood that various details of construction may be varied through a wide range without departing from the principles of this invention and it is, therefore, not the purpose to limit the patent granted hereon, otherwise than necessitated by the scope of the appended claim.

I claim as my invention:

A rod and tube assembly comprising a tube having a reduced diameter curled end with open end slots at spaced intervals around the periphery thereof, a rod having an end portion inserted in said tube and a skirt portion overlying said curled end of the tube, a head on the rod in the tube engaging the inner face of the curled end and having lugs extending through said slots, said head and skirt coacting on opposite sides of the curled end of the tube to hold the tube and rod against relative longitudinal movement and said lugs coacting with the slots of the tube to hold the rod and tube against relative rotational movement.

MATTHEW P. GRAHAM.

REFERENCES CITED

The following references are of record in the file of this patent:

UNITED STATES PATENTS

| Number | Name | Date |
|---|---|---|
| 222,251 | Dackus | Dec. 2, 1879 |
| 255,708 | Wassmer | Mar. 28, 1882 |
| 418,198 | Lemp et al. | Dec. 31, 1889 |
| 763,676 | Knobbs | June 28, 1904 |
| 764,943 | Guy | July 12, 1904 |
| 886,515 | Jude | May 5, 1908 |
| 1,014,684 | Weygard | Jan. 16, 1912 |
| 1,165,514 | Kelly | Dec. 28, 1915 |
| 1,548,990 | Garman | Aug. 11, 1925 |
| 1,824,810 | Ford | Sept. 29, 1931 |
| 1,865,808 | Abegg | July 5, 1932 |
| 2,213,004 | Hickman | Aug. 27, 1940 |
| 2,426,289 | Wallace et al. | Aug. 26, 1947 |
| 2,434,080 | Rosa | Jan. 6, 1948 |